April 20, 1926. 1,581,357
G. E. MacCORMAC
ARC LAMP, ELECTRODE UNIT FOR THE SAME, AND METHOD OF PRODUCING LIGHT
Filed Oct. 11, 1920 2 Sheets-Sheet 1
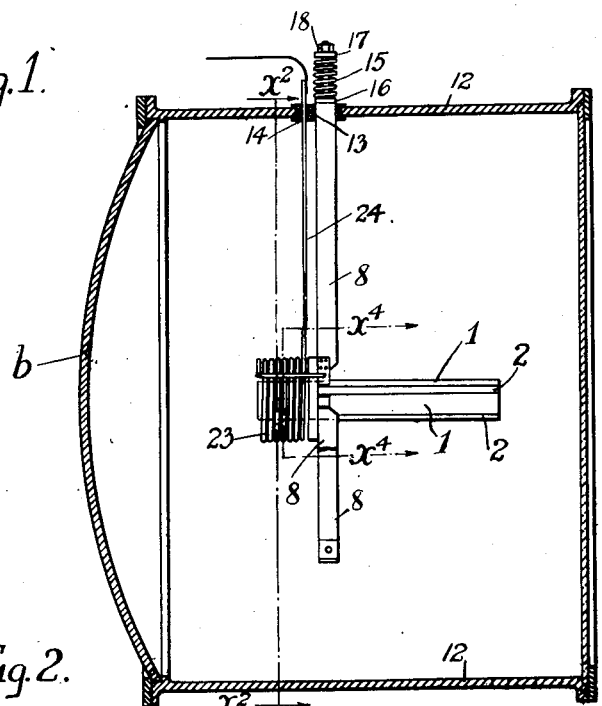
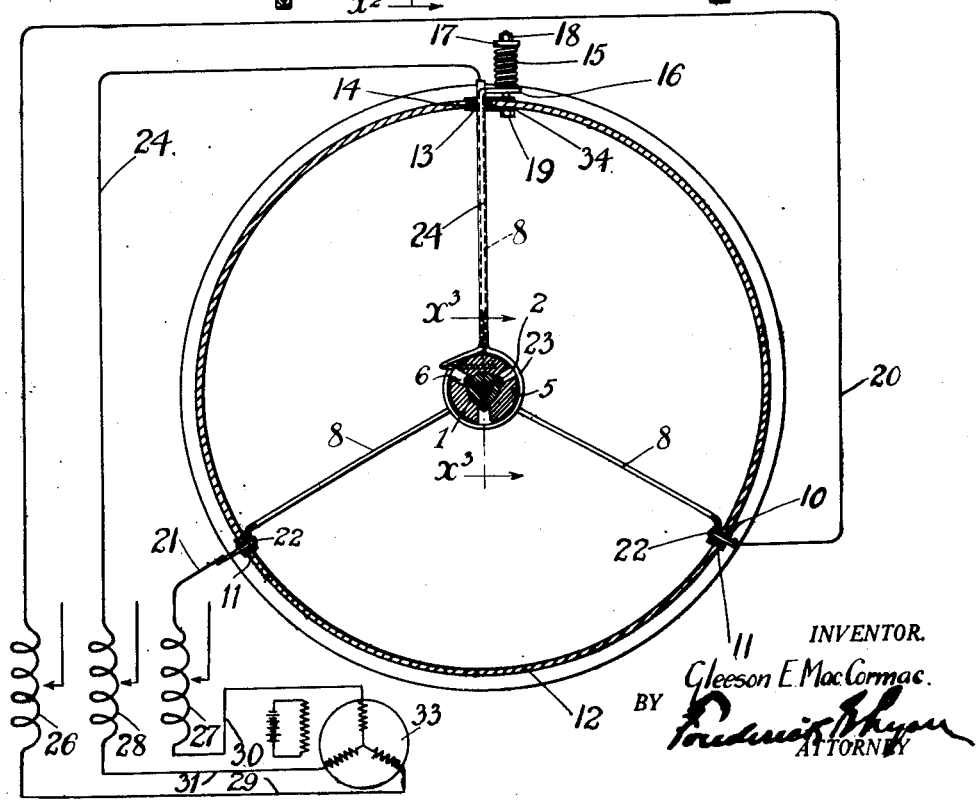
INVENTOR.
Gleeson E. MacCormac.
BY
ATTORNEY

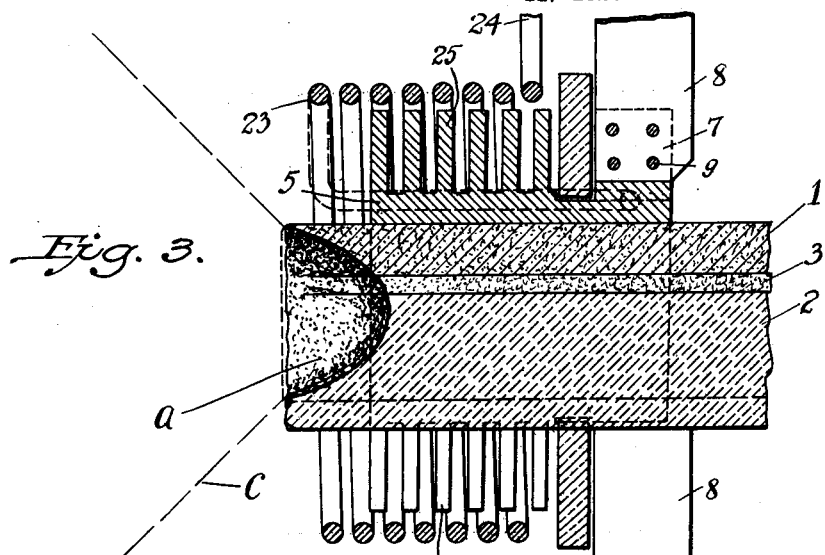
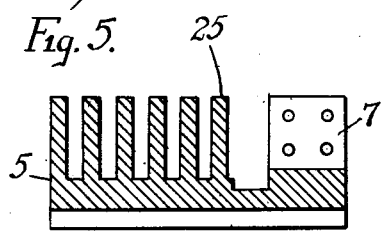
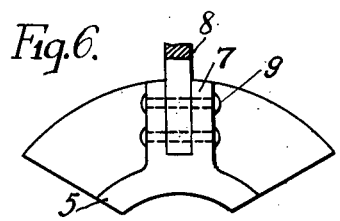
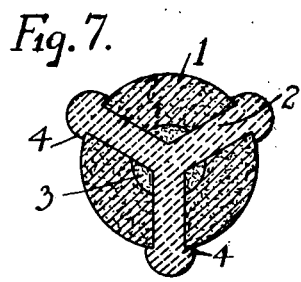
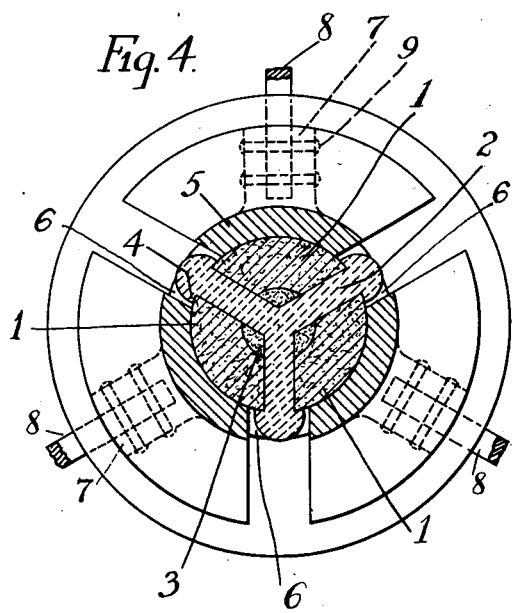

Patented Apr. 20, 1926.

1,581,357

UNITED STATES PATENT OFFICE.

GLEESON E. MacCORMAC, OF LOS ANGELES, CALIFORNIA.

ARC LAMP, ELECTRODE UNIT FOR THE SAME AND METHOD OF PRODUCING LIGHT.

Application filed October 11, 1920. Serial No. 416,242.

*To all whom it may concern:*

Be it known that I, GLEESON E. MAC-CORMAC, a citizen of the United States, and a resident of Los Angeles, county of Los Angeles, State of California, have invented a new and useful Arc Lamp, Electrode Unit for the Same and Method of Producing Light, of which the following is a specification.

This invention relates to the production of an arc as a source of light for illumination and photographic purposes, and an object of the invention, in general, is to produce more intense sources of light than the lamps of prior construction.

The electric current available at the motion picture studios for producing the light used in the artificial illumination of the scenes being photographed is of the alternating type, and artificial lighting is being more and more used in the place of sunlight or to supplement the same. In consequence of this it is necessary to use either alternating current arc lamps or to convert the alternating current into direct current and use direct current arc lamps. When using the alternating current lamps it is necessary to provide them in comparatively large numbers, since their positive electrodes have substantially no craters and, consequently, the individual lamps are of comparatively low candle power and produce a light that is very deficient in actinic value. Recently, direct current lamps have been used largely instead of alternating current lamps, but this entails the installation of motor-generator sets for conversion of the alternating current into direct current. The type of direct current lamps employed is the intense arc unit such as is used in the army and navy of the United States. While such unit source of light is far superior for motion picture photography to the greater number of sources incident to the use of the alternating current lamps, there are objections to its use, one objection being that the comparatively large amount of mechanism employed in cooling the electrodes and their holders causes obstruction of many of the light rays issuing from the crater of the lamp.

One of the principal objects of this invention is to provide a satisfactory light that can be produced from the use of the readily available alternating electric current.

By the use of this invention there results great economy in the consumption of electric energy for the production of a given strength of radiation, and the necessary apparatus within the reflecting zone of the mirror is reduced to a minimum. This invention avoids the necessity of positioning an electrode and its support between the crater and the mirror, thus permitting the entire crater to be exposed to the reflecting surface of the mirror.

Another object of the invention is to deflect gasified particles outwardly from the burning ends of the electrodes so that the electrodes will not waste away too quickly at the margins of the crater and thus decrease the depth of the crater. The advantage of a deep crater is that it holds more incandescent gas than will a shallow crater, and it is the incandescent gas in the crater which emits the radiations of greatest intensity, and especially the actinic light upon which photography depends.

With the prior types of alternating current arc lamps substantially no crater is produced, and another object of this invention is to effect the production of a large crater by the use of alternating current.

In projecting motion pictures a flickering effect is produced on the exhibiting screen and this is generally thought to be the result of the intermittent projection of the light rays by rotation of the shutter, but another factor producing flickering is not due at all to the operation of the projection machine but results from variations from moment to moment in the intensity and quality of the artificial light employed in the production of the negatives with the consequent variability in the actinic value of the light. Such variability causes the production of negatives which, though they should be exact duplications as to density of any given area, have corresponding areas of different densities. In using the ordinary single phase alternating current arc lamp for motion picture photography, it often happens that the camera shutter operates in step with the cycle in such manner that during successive openings of the shutter the value of the alternating current is alternatively a maximum and a minimum which results in producing a strip of film having alternate negative frames of slight density. When the strip is printed the corresponding portions will be very dense and therefore will obstruct the light rays during projection of the film.

To effect the foregoing objects I utilize a polyphase electric current and apply each of the phases to an electrode.

In the preferred embodiment of the invention I position the electrodes lengthwise of one another with suitable electrical insulation therebetween so that the arcs created between the electrodes will occur at one end of said electrodes.

While any number of electrodes and phases may be employed, one phase for each electrode, because of practical reasons I prefer, at present, to employ a three-phase current and I therefore utilize three electrodes in the present apparatus.

Another advantage of combining the electrodes into a single unit with insulation therebetween instead of mounting the electrodes as separate elements is that by the first construction the gases cannot escape from the crater excepting at the mouth thereof and the crater is much larger than the combined craters of the electrodes when burned separately. By employing a polyphase current or, as in this instance, a three-phase current, the voltage does not drop to zero, as does a single phase current, because of the overlapping of the cycles of the different phases.

Other objects and advantages will appear hereinafter.

The accompanying drawings illustrate the invention:

Figure 1 is a sectional elevation of a lamp constructed in accordance with the provisions of this invention and by the use of which the new method is performed.

Fig. 2 is a sectional elevation, mainly on line indicated by $X^2$—$X^2$ Fig. 1, the source of polyphase electric current and the connections of said source with the lamp being indicated diagrammatically.

Fig. 3 is an enlarged fragmental sectional elevation on line indicated by $X^3$—$X^3$, Fig. 2.

Fig. 4 is an enlarged sectional elevation on line indicated by $X^4$—$X^4$ Fig. 1.

Fig. 5 is a longitudinal mid-section of one of the shoes shown in Fig. 6.

Fig. 6 is an end view of one of the shoes and a fragment of its supporting arm.

Fig. 7 is a cross section of the electrode unit.

Referring now to Figs. 1 to 7 inclusive, there is provided a plurality of electrodes 1, constructed of any suitable shape and positioned lengthwise of one another. In this particular instance three such electrodes are shown in the drawings. Preferably the electrodes 1 are positioned relatively close together and electrically insulated from one another by an electrical insulator indicated at 2. In the instance shown in the drawings the electrodes 1 are sectoral in cross section and the insulator 2 is Y-shape with its branches interposed between the adjacent electrodes.

Between the electrodes 1 and the central portion of the insulator 2 may be placed suitable mineral salts 3 when it is desired to secure a differently colored light than can be produced by the vaporization of the electrodes 1. The electrodes 1 may be made of carbon or other suitable material and the insulator 2 may be formed of lime and carborundum, which I have found to be very satisfactory; however, it is to be understood that any non-fusible vaporizable electric insulating material or materials other than those mentioned may be employed, if desired. In the instance shown in the drawings, the insulator 2 has the extremity of its arms forming beads 4, which slightly overlap the periphery of the electrodes 1, thus retaining the electrodes in position. The electrodes 1, insulator 2 and mineral salts 3 all together constitute a single electrode unit and said unit may be supported in any desired position by any suitable means.

The electrode support in this instance is constructed as follows: Bearing upon the periphery of each of the electrodes 1 is a curved shoe 5 which substantially fits and loosely engages the electrode. The shoes are of shorter length of arc than the electrodes 1 so as to leave spaces 6 between the adjacent ends of the shoes to accommodate the beads 4. Each shoe 5 is provided with a pair of spaced outstanding ears 7 which receive between them an arm 8. In this particular instance there are three shoes and consequently three arms, and the arms are secured to the ears by fasteners 9 which may be in the form of rivets or their equivalents. Two of the arms 8 have their outer ends seated upon the inner ends of insulating bushings 10, which project through openings 11 in a lamp casing 12; and the remaining arm 8 extends through a bushing 13 which projects through an opening 14 in the casing 12. Thus two of the arms 8 are fixed and the other arm is movable relative thereto. The movable arm 8 is yieldingly held inwardly by a spring 15 mounted between the outer angularly bent end 16 of the movable arm and a washer 17, said washer being held against the expansive force of the spring 15 by a nut 18 on a bolt 19 which is fastened to the casing 12 and insulated therefrom as indicated at 34. The spring 15 functions to press the electrodes 1 toward one another.

The electric current may be supplied to the electrodes 1 in any suitable manner, and in the particular instance shown in the drawings this is effected by connecting the fixed arms 8 with electric conductors 20, 21, respectively, by fasteners 22, the fixed arms being formed of material of suitable electric conductivity as, for example, copper. Thus the electric current is supplied to the two electrodes engaged by the shoes on the fixed arms 8. The other electrode 1 may be supplied with electric current through its associated shoe and, in this instance, to said shoe is connected one end of an electric coil 23 which has its other end connected to a conductor 24. The coil 23 encircles the shoes 5 and its function is to create a magnetic field around the electrodes so as to repel the gaseous particles formed at the burning ends of the electrodes, thus forcing the arc flame outwardly and hence preventing excessive vaporizing of the carbon adjacent the margins of the crater and also preventing the crater from becoming too deep.

As a further aid in keeping the electrodes comparatively cool rearwardly of the burning ends, the shoes 5 are preferably provided with radially extending fins 25 which function to rapidly radiate the heat transmitted from the electrodes to the shoes.

The conductors 20, 21 and 24 are preferably connected with suitable adjustable resistances indicated at 26, 27 and 28, respectively, for convenient regulation of the arcs, and said resistances are in turn connected by conductors 29, 30 and 31 to a suitable source 33 of polyphase electric current. In the instance shown the source 33 is a three-phase generator.

The invention described above operates as follows: In first starting the lamp into operation it is necessary to connect the electrodes together at the ends which are to produce the arcs by spreading a suitable electric conducting material upon the adjacent end of the insulator 2. This material may be, for example, carbon dust. If the lamp be shut off after burning, enough carbon vapor condenses on the exposed surfaces of the insulator 2 to form paths for the electric current in subsequent starting of the lamp. The three-phase current from the source 33 is received by the electrodes 1, the current in any one of the electrodes rising to a maximum voltage and decreasing to zero voltage. The phases being different for the different electrodes, that is to say overlapping, an arc will be continuously maintained and the emitted light will be of substantial uniform intensity. This is found of great importance where the lamp is employed in motion picture photography in order to avoid the production of "frames" of different densities. The arcs occur successively between the different electrodes in rotation about the center of the unit and produce the crater indicated at $a$ in Fig. 3. The mineral salts 3 will be vaporized, thus modifying the color of the light produced by the incandescent carbon vapor in the crater. The insulator 2 gradually vaporizes so that the uniform character of the crater will be maintained. It is to be noted that by the described construction there is no electrode between the crater and the mirror $b$.

The electric current in the coil 23 produces a magnetic field just rearwardly of the tip of the electrode unit and this magnetic field is a repellant force functioning to repel incandescent vapors issuing from the crater $a$. These issuing incandescent vapors flow outwardly from the crater toward the mirror in a gradually expanding path as indicated roughly by broken lines $c$ in Fig. 3.

The electrode unit may be adjusted from time to time to maintain the crater $a$ the desired distance from the mirror or the unit may be adjusted to change the distance as is readily understood by those versed in this art. The adjustment may be effected manually or it may be effected automatically by any well known or preferred form of mechanism. Such mechanism is well known in this art and forms no part of this present invention and therefore need not be described herein.

The electrodes 1 and insulator 2 together form a body having bores which holds the mineral salt or salts 3. The electrodes are positioned in a circle about the center of the unit and the shoes 5 function to press the electrodes toward the common center.

It will be understood from the foregoing description of the construction and operation of the lamp that arcing is effected between the different phases of a polyphase electric current within a zone sufficiently circumscribed to produce the effect of a single source of light and that the value of the current in the unit is relatively high at any given movement, in consequence of which the temperature of the incandescent gases in the crater $a$ is maintained or, in other words, the temperature of the gases does not fluctuate materially and produce a light that varies in intensity and quality as does the light heretofore emitted by the old form of alternating current arc lamp.

I claim:

1. An electrode unit comprising a plurality of electrodes positioned lengthwise of one another, an insulator between adjacent electrodes extending from end to end thereof, the electrodes and insulator throughout their length having portions spaced from one another, and a metallic salt in the spaces.

2. In an arc lamp, the combination of a plurality of electrodes positioned lengthwise of one another, an insulator between adjacent electrodes, shoes fitting and loosely engaging the peripheries of the electrodes respectively, means yieldingly forcing the shoes toward one another, and means to supply a different phase electric current to each of the shoes.

3. In an arc lamp, the combination of a plurality of electrodes positioned lengthwise of one another and insulated from one another to form an electrode unit, and means to produce a magnetic field just rearwardly of the tip of the electrode unit to repel the gas formed at the burning ends of the electrodes.

4. In combination, a source of polyphase electric current, and a light emitting element comprising an insulating core and electrodes extending lengthwise of and separated by the core, the different phases being applied to the respective electrodes.

5. An electrode unit comprising three electrodes sectoral in cross section, and a branched non-fusible vaporizable electric insulating body having its branches interposed between the electrodes, the extremities of the branches forming beads slighly overlapping the peripheries of the electrodes.

6. In an arc lamp, the combination of a plurality of electrodes positioned lengthwise of one another and insulated from one another to form an electrode unit, and an electric coil surrounding the electrode unit close to the tip thereof and connected in series with one of the electrodes.

7. An electrode unit comprising a plurality of electrodes approximately sectoral in cross section, and a non-fusible vaporizable electric insulating body interposed between the electrodes and forming beads slightly overlapping the peripheries of the electrodes.

Signed at Los Angeles, Calif, this 4th day of October 1920.

GLEESON E. MacCORMAC.